US011640446B2

United States Patent
Beigi et al.

(10) Patent No.: US 11,640,446 B2
(45) Date of Patent: May 2, 2023

(54) SYSTEM AND METHOD FOR GENERATING A SYNTHETIC DATASET FROM AN ORIGINAL DATASET

(71) Applicant: Medidata Solutions, Inc., New York, NY (US)

(72) Inventors: Mandis Beigi, White Plains, NY (US); Jacob Aptekar, Oakland, CA (US); Afrah Shafquat, Jericho, NY (US); Jason Mezey, New York, NY (US)

(73) Assignee: Medidata Solutions, Inc., New York, NY (US)

( * ) Notice: Subject to any disclaimer, the term of this patent is extended or adjusted under 35 U.S.C. 154(b) by 0 days.

(21) Appl. No.: 17/407,181

(22) Filed: Aug. 19, 2021

(65) Prior Publication Data

US 2023/0060848 A1    Mar. 2, 2023

(51) Int. Cl.
*G06F 21/62*   (2013.01)
*G06F 16/27*   (2019.01)
(Continued)

(52) U.S. Cl.
CPC ........ *G06F 18/2148* (2023.01); *G06F 16/278* (2019.01); *G06F 18/2133* (2023.01);
(Continued)

(58) Field of Classification Search
CPC .... G06F 21/6245; G06F 21/32; G06F 16/285; G06F 21/6254; G06F 7/36; G06F 7/32;
(Continued)

(56) References Cited

U.S. PATENT DOCUMENTS

2012/0030165 A1   2/2012   Guirguis et al.
2019/0156061 A1*  5/2019   Chakraborty ....... H04L 63/0421
(Continued)

FOREIGN PATENT DOCUMENTS

CN   108111294 A   6/2018

OTHER PUBLICATIONS

McInnes et al., UMAP: Uniform Manifold Approximation and Projection for Dimension Reduction [open-access archive], Sep. 18, 2020 [retrieved Nov. 26, 2021], Cornell Universify:arXiv, v3, 63 pgs. Retrieved: https://arxiv.org/abs/1802.03426 (Year: 2020).*

(Continued)

*Primary Examiner* — Matthew C Bella
*Assistant Examiner* — Dennis Rosario
(74) *Attorney, Agent, or Firm* — Steptoe & Johnson LLP; Carl B. Wischhusen

(57) ABSTRACT

A method for generating a synthetic dataset from an original dataset includes encoding categorical features of the original dataset, embedding the encoded dataset in a low-dimensional space, selecting a seed record from the embedded dataset, identifying a plurality of nearest neighbor records to the seed record, generating a new record by randomly selecting features from the plurality of nearest neighbor records, and concatenating the new record into the synthetic dataset. For a synthetic dataset that contains N records, which may be the same as or different from the number of records in the original dataset, the selecting, identifying, generating, and concatenating operations operate a total of N times on the records in the embedded dataset.

20 Claims, 11 Drawing Sheets

(51) Int. Cl.
  *G06F 18/214* (2023.01)
  *G06F 18/2133* (2023.01)
  *G06F 18/2135* (2023.01)
  *G06F 18/21* (2023.01)
  *G06F 18/2137* (2023.01)

(52) U.S. Cl.
  CPC ...... *G06F 18/2135* (2023.01); *G06F 18/2163* (2023.01); *G06F 18/21375* (2023.01); *G06F 21/6254* (2013.01)

(58) Field of Classification Search
  CPC ..... G06F 16/906; G06F 16/278; G06N 20/00; G06Q 20/40145; G06V 10/40; G06V 30/413; G06V 30/416; G06V 20/62; G06K 9/46; G06K 9/00442; G06K 9/00469; G06K 9/6276; G06K 9/6218; G06K 9/6223; G06T 7/0012; G16B 50/30; G16B 50/40; G16B 50/50; G16B 40/00; G16H 50/70; G16H 10/00; G16H 15/00; G16H 10/60; G16H 30/40; H04L 9/0869; H04L 63/0421; H04W 12/02
  See application file for complete search history.

(56) References Cited

U.S. PATENT DOCUMENTS

2021/0133621 A1\* 5/2021 Ravizza .................. G06N 5/045
2022/0067202 A1 3/2022 Nedelec et al.

OTHER PUBLICATIONS

Abraham et al., Advances in Intelligent Systems and Computing: Emerging Technologies in Data Mining and Information Security: Probabilistic Dimension Reduction Method for Privacy Preserving Data Clustering, 2018, Springer, vol. 813, 864 pgs. Retrieved: https://www.researchgate.net/profile/Sucharita-Mitra/publication/327390020_Development_of_Cardiac_Disease_Classifier_Using_Rough_Set_Decision_System_Proceedings_of_IEMIS_2018_Volume_2/links/5f414a1a299bf13404e1e5b9/Development-of-Cardiac-Disease-Classifier-Using-Rough-Set-Decision-System-Proceedings_of_IEMIS_2018_Volume_2/links/5f414a1a299bf13404e1e5b9/Development-of-Cardiac-Disease-Classifier-Using-Rough-Set-Decision-System-Proceedings-of-IEMIS-2018-Volume-2.pdf#page=541 (Year: 2018).\*
Bindschaedler et al., Plausible Deniability for Privacy-Preserving Data Synthesis (Extended Version) [open access archive]; Aug. 26, 2017 [retrieved Nov. 26, 2021], Cornell University: arXiv, v1, 17 pages. Retrieved: https://arxiv.org/abs/1708.07975v1 (Year: 2017).\*
Hall, Correlation-based Feature Selection for Machine Learning [thesis: The University of Waikato], Apr. 1999 [retrieved Nov. 26, 2021], 198 pgs. Retrieved: https://www.cs.waikato.ac.nz/~ml/publications/1999/99MH-Thesis.pdf (Year: 1999).\*
Edge et al, Design of a Privacy-Preserving Data Platform for Collaboration Against Human Trafficking, Sep. 18, 2020 [retrieved Jul. 29, 2022], Cornell University:arXiv [open-access archive], version v2, pp. 1-19. Retrieved: https://arxiv.org/abs/2005.05688 (Year: 2020).\*
Wang et al., Privacy-preserving high-dimensional data publishing for classification, online: Mar. 3, 2020 [retrieved Jul. 29, 2022], Computers & Security, vol. 93, pp. 1-10. Retrieved: https://www.sciencedirect.com/science/article/pii/S0167404820300705 (Year: 2020).\*

Beaulieu-Jones, Brett K. et al., "Privacy-Preserving Generative Deep Neural Networks Support Clinical Data Sharing," Circulation: Cardiovascular Quality and Outcomes, Jul. 2019.
Kasthurirathne, Suranga N. et al., "Generative Adversarial Networks for Creating Synthetic Free-Text Medical Data: A Proposal for Collaborative Research and Re-use of Machine Learning Models," Proceedings—AMIA Joint Summits on Translational Science, pp. 335-344, May 2021.
Choi et al., "Generating Multi-label Discrete Patient Records using Generative Adversarial Networks," Proceedings of Machine Learning for Healthcare, vol. 68, 2017. [version submitted retrieved from arXiv:1703.06490v3 (20 pages)].
El Emam et al., "Optimizing the synthesis of clinical trial data using sequential trees," Journal of the American Medical Informatics Association, 28(1), 2021. [version submitted retrieved from https://academic.oup.com/jamia/article/28/1/3/5981525 (11 pages)].
El Emam et al., "Anonymizing health data," O'Reilly Press Cambridge, 2014, pp. 1-44.
European Medicines Agency, Workshop Report "Data anonymisation—a key enabler for clinical data sharing," Dec. 2018. [version submitted retrieved from https://www.ema.europa.eu/en/documents/report/report-data-anonymisation-key-enabler-clinical-data-sharing_en.pdf (32 pages)].
Park et al., "Data synthesis based on Generative Adversarial Networks," Proceedings of the VLDB Endowment, vol. 11, No. 10, Jul. 2018. [version submitted retrieved from arXiv:1806.03384v5 (16 pages)].
Srivastava et al., "Veegan: Reducing Mode Collapse in GANs using Implicit Variational Learning," 31st Conference on Neural Information Processing Systems, Nov. 2017. [version submitted retrieved from arXiv:1705.07761v3 (17 pages)].
Xu et al., "Modeling Tabular Data using Conditional GAN," 33rd Conference on Neural Information Processing Systems, Oct. 2019. [version submitted retrieved from arXiv:1907.00503v2 (15 pages)].
Zhang, J. et al., "PrivBayes: Private Data Release via Bayesian Networks," ACM Transactions on Database Systems vol. 42, No. 4, Article 25, 2017, pp. 1-41. [version submitted retrieved from https://dl.acm.org/doi/pdf/10.1145/3134428].
Zhang, Z. et al., "Ensuring electronic medical record simulation through better training, modeling, and evaluation," Journal of the American Medical Informatics Association 27(1): 2019, pp. 99-108. [version submitted retrieved from https://academic.oup.com/jamia/article/27/1/99/5583723].
Armanious et al., "MedGAN: Medical Image Translation using GANs," Computerized Medical Imaging and Graphics, vol. 79, 2020. [version submitted retrieved from arXiv:1806.06397v2 (16 pages)].
Beaulieu-Jones et al., "Privacy-preserving generative deep neural networks support clinical data sharing," BioRxiv, 2018 [version submitted retrieved from BioRxiv https://doi.org/10.1101/159756 preprint posted Jul. 2017 (16 pages)].
Franconi et al. "Community Innovation Survey: comparable dissemination", EUROSTAT Methodologies and Working papers, 2009 edition, pp. 11-23.
Torra et al., "Evaluating Fuzzy Clustering Algorithms for Microdata Protection", PSD 2004, LNCS 3050, 2004, pp. 175-186.
Sivakumar et al. "Synthetic sampling from small datasets: A modified mega-trend diffusion approach using k-nearest neighbors", Knowledge-Based Systems, vol. 236, 2022, pp. 1-12.
Yale et al. "Generation and evaluation of privacy preserving synthetic health data", Neurocomputing, vol. 416, 2020, pp. 244-255.
Zhu et al. "Private-kNN: Practical Differential Privacy for Computer Vision", 2020 IEEE/CVF Conference on Computer Vision and Pattern Recognition (CVPR), 2020, pp. 11851-11859.
Extended European Search Report from European Patent Application No. 22191229.8, dated Jan. 17, 2023, 9 pages.

\* cited by examiner

Features →

$$\text{Records} \downarrow \begin{bmatrix} r^0_0 & \cdots & r^0_{m-1} \\ \vdots & \ddots & \vdots \\ r^{n-1}_0 & \cdots & r^{n-1}_{m-1} \end{bmatrix}$$

SYSTEM AND METHOD FOR GENERATING A SYNTHETIC DATASET FROM AN ORIGINAL DATASET

BACKGROUND

The widespread adoption of Electronic Health Records (EHRs) in healthcare has led to an explosion in the quantity of private health data. With this growth in data, scientists and researchers have been able to use techniques in artificial intelligence and machine learning to derive insights and predictions for advancing patient care and treatments. However, due to strict privacy requirements on patient data, these data cannot be easily shared between organizations or made widely available to scientists and researchers.

Techniques have been developed to de-identify and anonymize such data, but these techniques still do not fully guarantee patient privacy. These techniques may leave residual patterns in the anonymized data that, together with other sources of information, can help pinpoint and identify an individual.

Data from clinical trials (sometimes called "clinical studies") are also prime sources of private health data. Like EHR data, these data often are in electronic form having come from Electronic Data Capture (EDC) systems. Clinical trial data are often available in much smaller sample sizes than EHR data (tens or hundreds of records compared to thousands) and, besides being subject to strong privacy interests for subjects (or patients), there are also strong privacy interests for trial sponsors or data contributors, as well as regulatory and technical protection requirements. Clinical trial data are also valuable (and maybe more valuable than EHR data) because the data come from subjects who have consented to be part of a controlled experiment. Such experiments are designed to make high value inferences (e.g., impact of a drug versus placebo on subject survival for a specific disease under a specific treatment regime). This type of data is also useful to estimate the power of a clinical trial design, discover concomitant drug impacts, and identify subject factors that can impact clinical trial success rates. EDC data thus represents high-dimensional data collected repeatedly for each subject on regular schedules under carefully controlled and regulated processes.

Figure 1A:
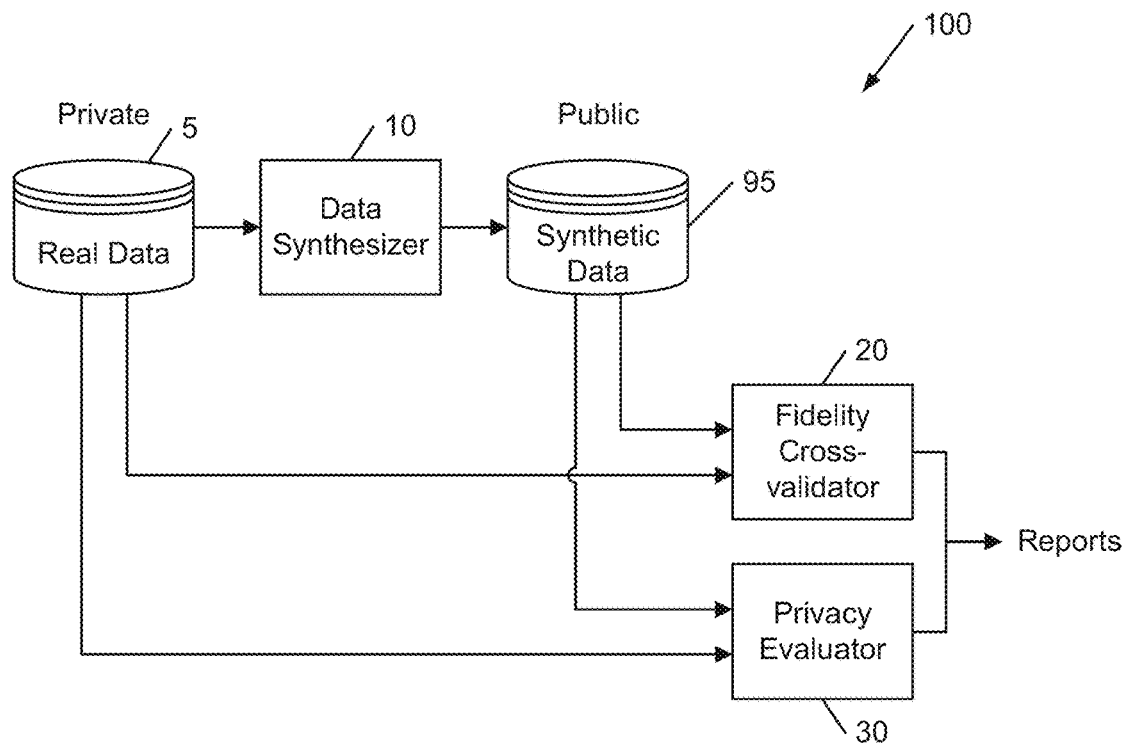
FIGS. 1A-1B are block diagrams of a system for generating a synthetic dataset, according to an embodiment of the present invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

As mentioned above, techniques to de-identify and anonymize EHR data do not fully guarantee patient privacy for that type of data. Other techniques, such as Generative Adversarial Networks (GANs) and Variational Autoencoders (VAEs), are able to provide privacy control by using deep learning and machine learning to generate synthetic data from the learned distribution. However, these techniques require the large volumes of data afforded by EHR, and do not work well with the smaller datasets of EDC data from clinical trials. Thus, privacy issues, both for subjects and sponsors of clinical trials, still exist.

The inventors have developed a method and system to address these privacy challenges by generating synthetic datasets that still retain high fidelity. The method combines a low-dimensional embedding of real data to identify a subject's nearest neighbors in compressed feature space with a feature permutation and recombining approach to introduce controlled, but realistic, variation. The method generates high-fidelity, synthetic subject records and operates efficiently across a wide variety of data-regimes and data-types, while concealing the identity of subjects and sources (e.g., sponsors and contributors).

In this specification, "fidelity" includes "statistical fidelity," which means that any analytics run on the synthetic data produce the same or very similar results as those run on the real data. In addition, "privacy" refers to the unlikelihood that an individual can be identified given the circumstances of the individual case, e.g., the aggregation of the data.

Figure 1B:
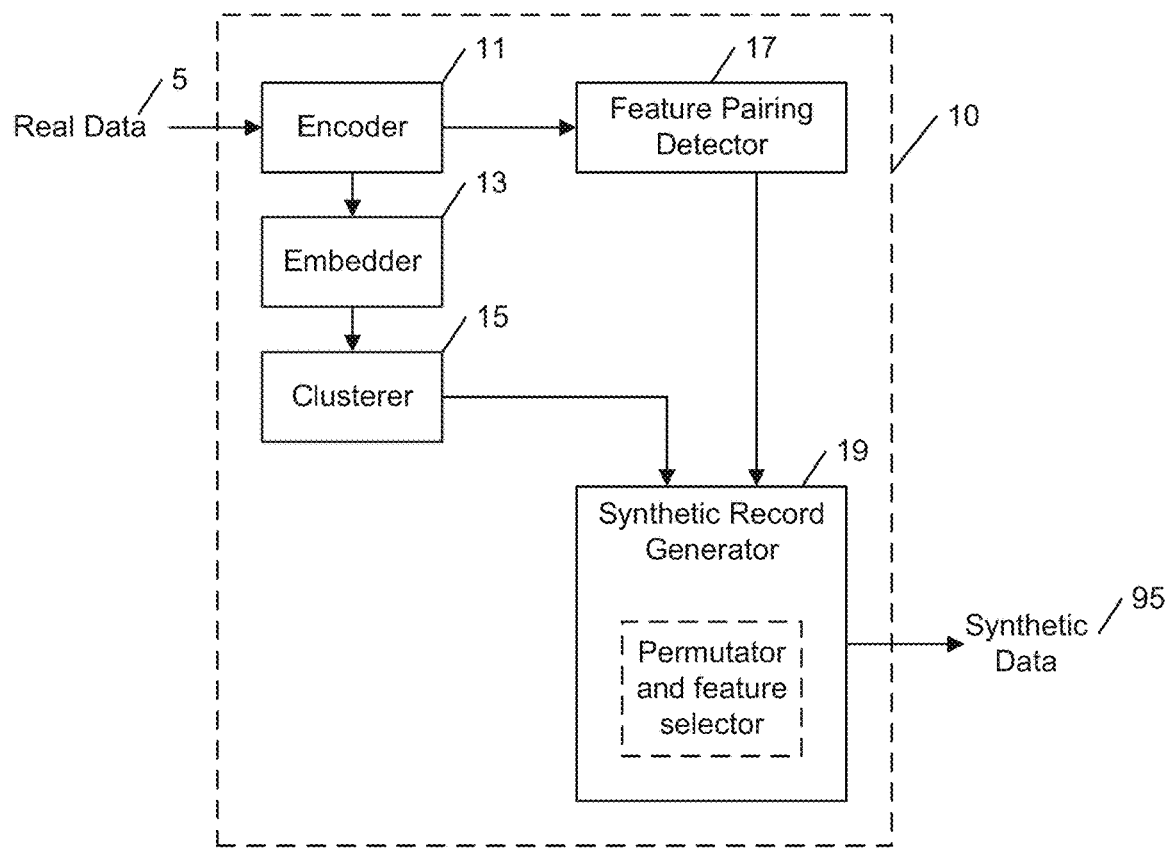

An embodiment of the system is shown in FIGS. 1A and 1B. System 100 includes data synthesizer 10, which takes original, real data 5 and generates synthetic data 95. Fidelity cross-validator 20 indicates the fidelity of the synthetic data to the real data. Privacy evaluator 30 assesses how well the invention protects the privacy of the data compared to other numerical methods.

Synthesizer 10 is shown in more detail in FIG. 1B. Synthesizer 10 includes encoder 11, embedder 13, clusterer 15, feature pairing detector 17, and synthetic record generator 19. Encoder 11 encodes categorical features, and embedder 13 embeds the records in a low-dimensional space. Clusterer 15 selects a seed record as well as a "cluster" of records around it. Feature pairing detector 17 detects features that are related (or statistically correlated), such as age and birthdate, so as to co-segregate them when generating synthetic records. Synthetic record generator 19 takes the cluster of records, noting the well-correlated features, and permutes the features of the cluster of records to generate synthetic records. More details about the operations of these blocks will be provided in conjunction with the flowchart in FIG. 1C.

Figure 1C:
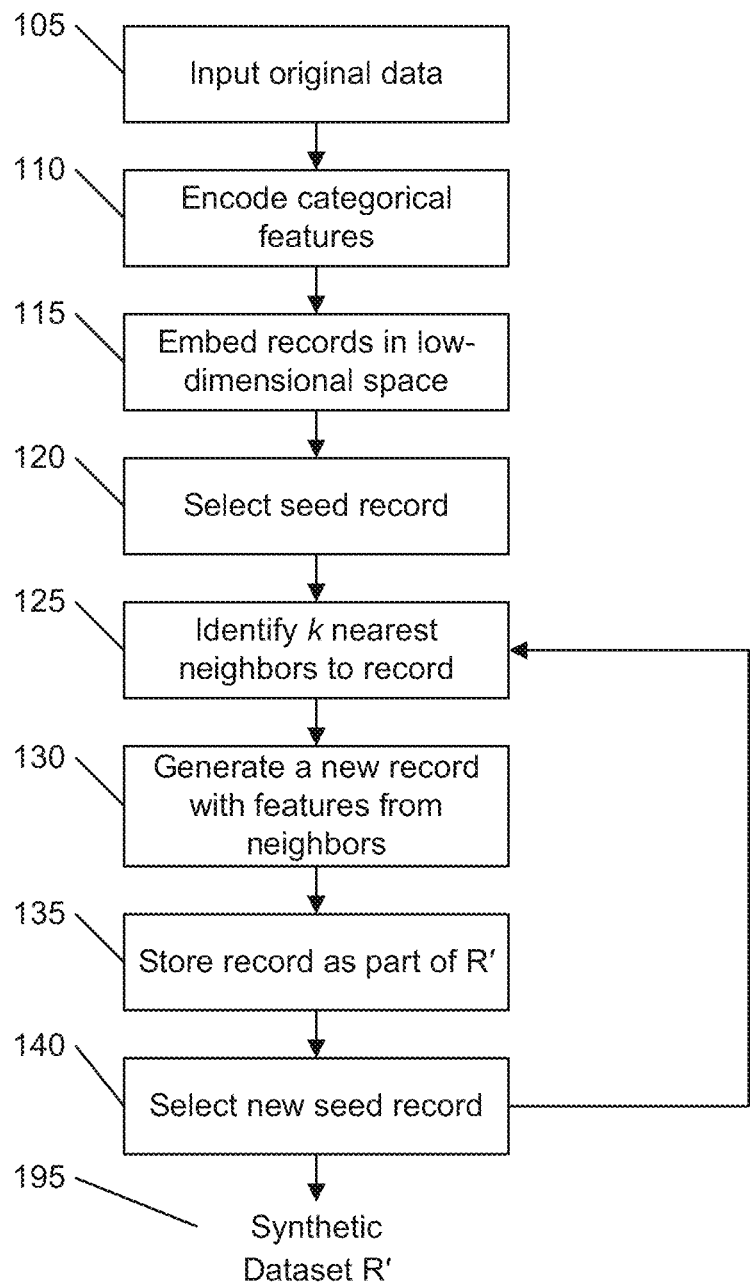
FIG. 1C is a flowchart showing how a synthetic dataset may be generated, according to an embodiment of the present invention.
Figures 2A, 2B:
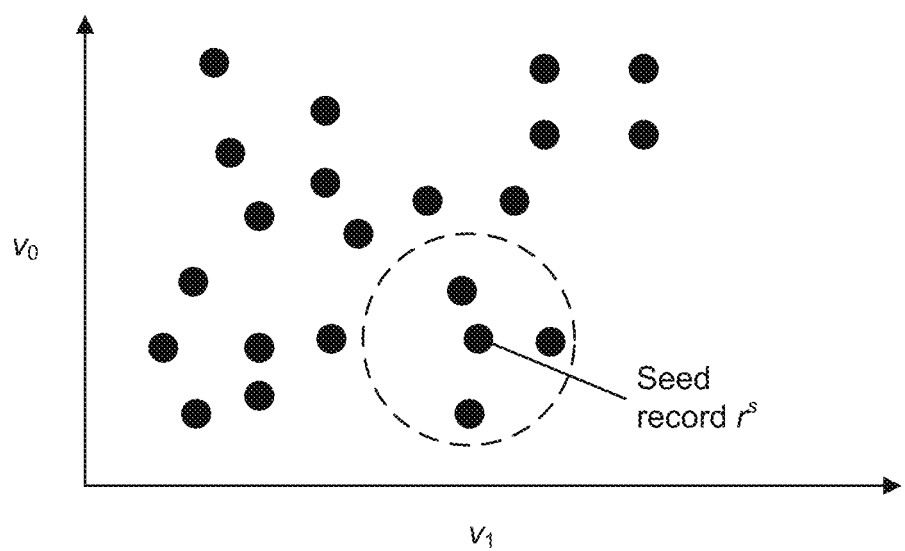
FIGS. 2A-2E show more details regarding the process of FIG. 1C.

The inventors' method includes the following methodological pseudo-code:
1. Original dataset $X \in \mathbf{R}^{n \times m}$ with n records and m features;
2. Embed X into space V with dimension p (e.g., t-SNE, UMAP, PCA), producing embedded points $r^s$;
3. Use the following properties:
   N>0 (size of synthetic dataset);
   k>0 (number of neighbors, also called "cluster");
   p(embedding dimension, m>p>0);
   T(•)feature permutation mechanism.
4. Generate synthetic dataset $R \in \mathbf{R}^{N \times m}$: while i≤N do:
   generate random seed to pick some $r^s$;
   select k nearest neighbors of $r^s$ ($l^2$ distance);
   generate new record $r^{s'}$ by permuting features according to T(•);
   store $r^{s'}$ for combining with other generated records to form R;
   i=i+1; end while Reference is now made to FIGS. 1C and 2A-2E. FIG. 1C is a flowchart showing how a synthetic dataset may be generated, according to an embodiment of the present invention. The original source dataset is input in operation 105. This dataset contains n records, where each record represents the data for a subject (or patient) and each record is represented by m distinct features (sometimes called "variables"). The dataset may be represented as shown in FIG. 2A as a set of tabular data with n records and m features. The method is designed to work on large and small datasets, but it has its greatest advantages working with small datasets, such as those that come from clinical trials. The features may be categorical or numerical, and may include demographics, such as name, age, gender, country, vital statistics, such as height, weight, blood pressure, heart rate, etc., and other types of data.

In operation 110, the dataset is processed by encoding the categorical features. Categorical feature encoding may include label encoding or one-hot encoding, which converts categorical values to numerical values. Missing values are then imputed by filling in the mean and mode for numerical and categorical features, respectively. This operation converts the data to all numerical values without missing values, to prepare the data for the embedding operation, described next.

Figure 2C:
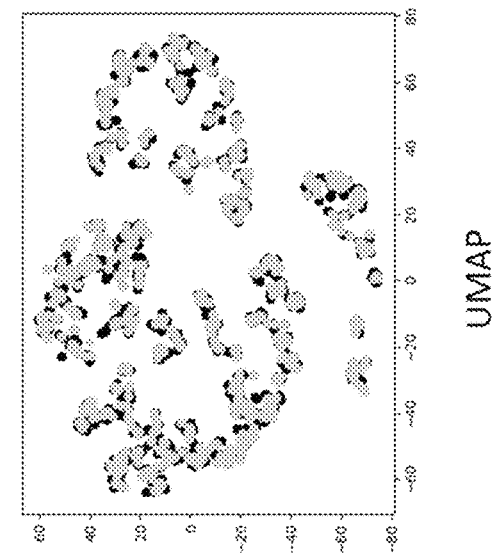
Figure 2C:
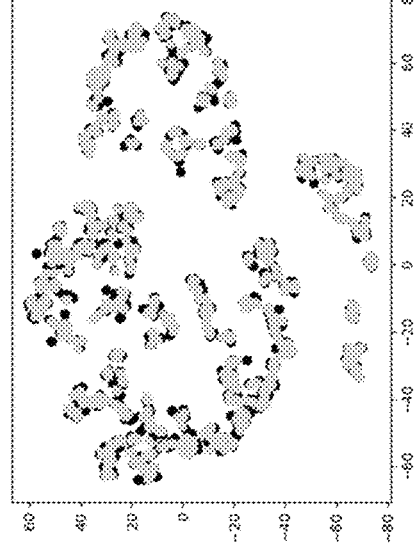
Figure 2C:
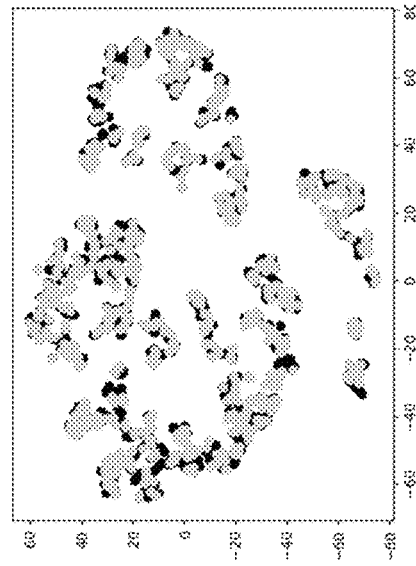

In operation 115, the records are embedded in low-dimensional space. This embedding comprises mapping of the records to a p-dimensional feature space V, where p is between 0 and m. Preferably, p is small, e.g., two or three, resulting in a low-dimensional feature space, which makes the subsequent k-nearest neighbor clustering operation work better. The embedding helps determine which records are similar to each other. FIG. 2B shows a space in which p=2. Embedding may be accomplished using t-stochastic neighbor embedding (t-SNE), uniform manifold approximation and projection (UMAP), or principal component analysis (PCA). T-SNE (sometimes called t-distributed SNE), which is shown in FIG. 2B, computes the probability that pairs of records in the high-dimensional space are related, and then chooses low-dimensional embeddings that produce a similar distribution. UMAP is similar to t-SNE, but it assumes that the data are uniformly distributed on a locally connected Riemannian manifold and that the Riemannian metric is locally constant or approximately locally constant. PCA computes the principal components (the dimensions in the low-dimensional space) of a set of records and uses the principal components to perform a change of basis on the data, sometimes using only the first few principal components and ignoring the rest. FIG. 2C shows the differences between using these three types of dimensionality reduction. The black dots show the original data; the gray dots show how each method generates a slightly different synthetic dataset.

Figure 2D:
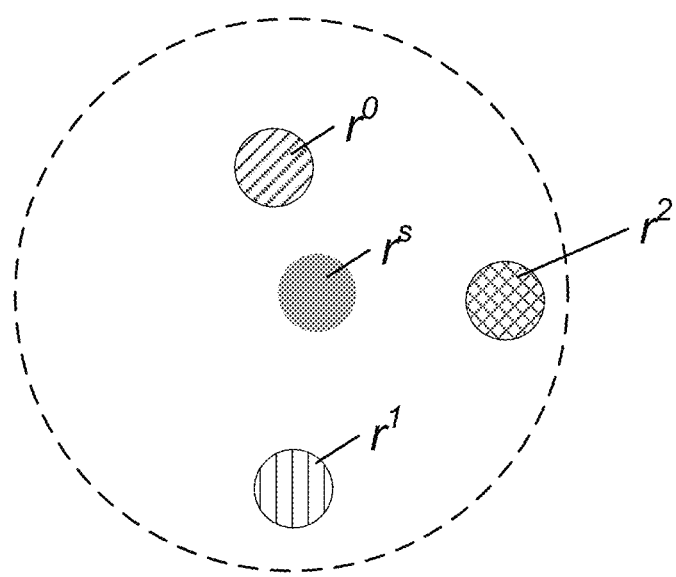

Once the records are embedded in low-dimensional space, a seed record $r^s$ is selected at random in operation 120. Operation 125 then identifies the k nearest neighbors to the seed record. The value of k is selected heuristically based on the trade-off between fidelity and privacy and on the type of application. As k increases, fidelity decreases, but privacy increases. FIG. 2D shows the situation in which k=3, so the three nearest neighbors to seed record $r^s$ are identified. These are labeled $r^0$, $r^1$, and $r^2$.

In operation 130, a new, synthetic record, $r^{s'}$, is generated. For each record in the low-dimensional space, the method generates one or more synthetic records by permuting the features of its k nearby neighbors within a certain radius/distance and within the same cluster. There may be several possible permutation algorithms—circular, random with repetition, random without repetition, etc. The inventors typically use circular permutation, which goes through all the k neighbors in the cluster, taking the first feature value of the first neighbor, the second feature value of the second neighbor, etc. In one embodiment of the invention, small amounts of noise may be added to the numeric features to guarantee new, original feature values.

Several parameters are configurable. The ratio of the number of synthetic records ("N") to the number of real records ("n") is configurable. That is, N may equal n, N may be less than n, or N may be greater than n. In the latter case, it may be useful to generate more than one synthetic record (on average) for each real record, for example, if there is a special cohort (population) of data or if there is not enough data for a cohort, and more data needs to be produced for training and/or analysis. Cluster size k is also configurable and may be fixed or variable: the smaller the cluster size, the closer the generated subject is to a real subject. Another configurable parameter is used to preserve the privacy of subjects who have distinctive feature values (i.e., outliers), and the method can be configured to omit these subjects' records. Mathematically, an "outlier" is defined as a record having a distance from its closest neighbor that is larger than the $q^{th}$ percentile of the distances of all the records to their closest neighbor. The value for q is a configurable parameter, and one example of q is 95.

Figure 2E:
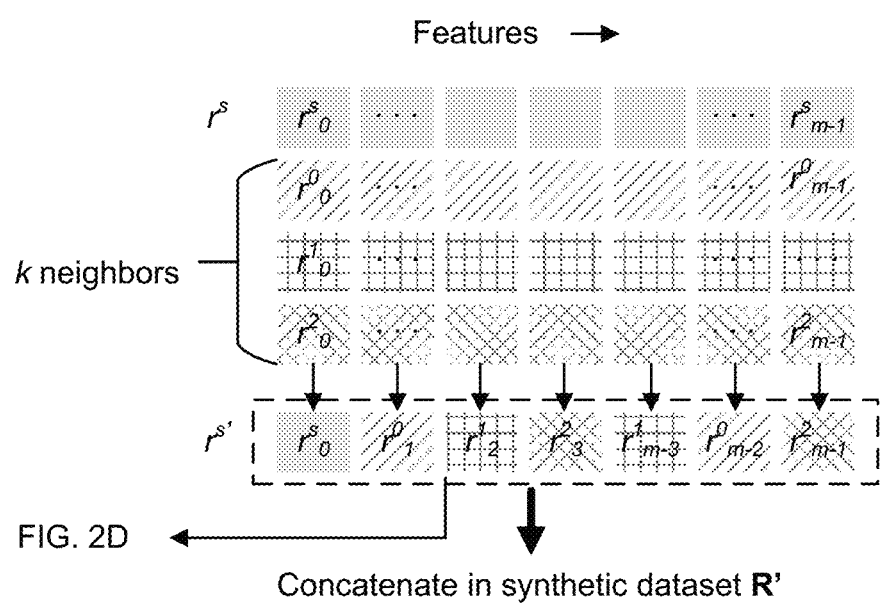

FIG. 2E shows an example of the generation of synthetic record $r^{s'}$. Each feature of $r^{s'}$ is randomly permuted from the k+1 set of $r^s$ and its k nearest neighbors. Thus, in FIG. 2E, the first feature in synthetic record $r^{s'}$ is from $r^s$, the second and the next-to-last are from $r^0$, the third and fifth are from $r^1$, and the fourth and last features are from $r^2$.

Figure 3A:
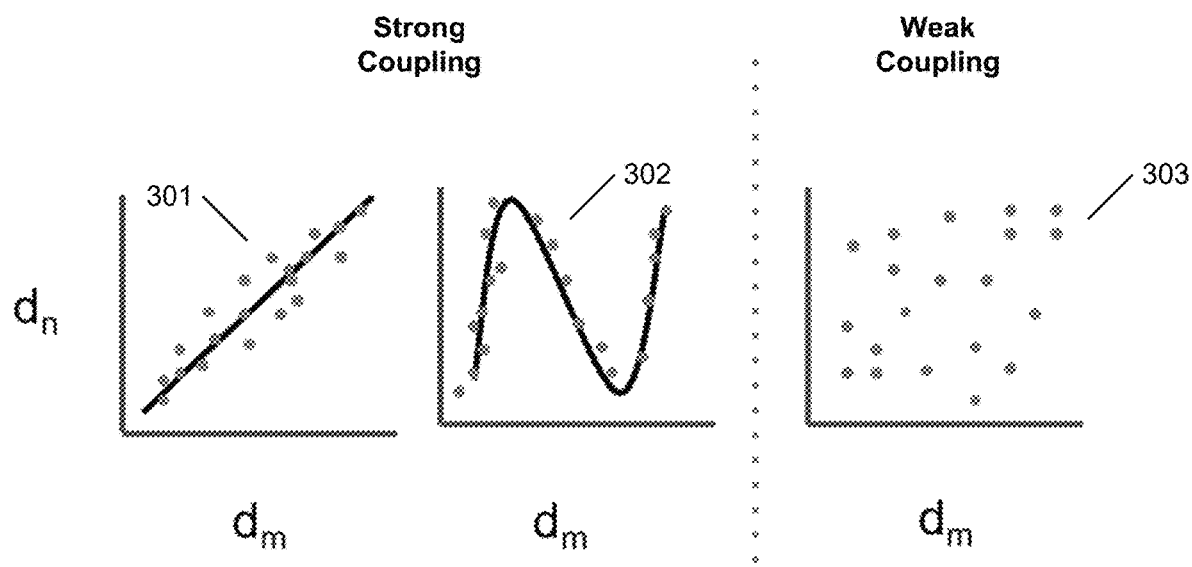
FIGS. 3A-3D show different aspects of the data involved in developing the present invention.

When permuting features from nearest neighbors, the method works better if the features are weakly coupled or correlated with each other. FIG. 3A shows three distributions of sets of two features. Distribution 301 shows a linear, high correlation between a first set of two features, and distribution 302 shows a non-linear, high correlation between a second set of two features. In contrast, distribution 303 shows a weak correlation between a third set of two features.

A novel aspect of operation 130 is that it also works with highly correlated features of a subject's record. It finds such highly correlated features and co-segregates them in order to make the synthesized data more realistic. For example, a subject's record may contain eight features: birthdate, gender, address, age, height, weight, blood pressure, and body mass index (BMI). Birthdate and age are highly correlated with each other and BMI, height, and weight are highly correlated. Instead of treating all of the features in a subject's record separately when randomly combining those from the nearest neighbors, operation 130 may first determine the features that are highly correlated and then enforce co-segregation to keep them together in the synthetic record. So, the subject's age and birthdate would always be kept together in the synthetic record, as would the subject's BMI, height, and weight (although all five of these features would not necessarily be kept together), but gender, address, and blood pressure would all be randomly permuted with those of the record's nearest neighbors.

Figure 3B:
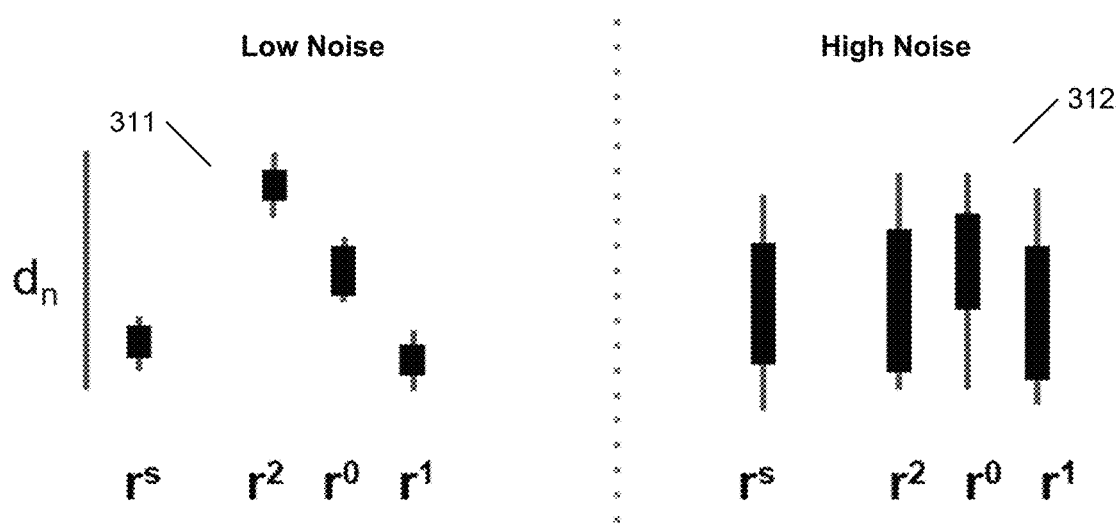

The method also works better with features that are "high noise" and "low precision," as often occur in clinical trials. FIG. 3B shows examples of low-noise (311) and high-noise (312) feature distributions. Individual measurements (e.g., blood pressure) are assumed to be noisy and imprecise. As a result, for most feature values, inter- and intra-subject variation has a similar magnitude for continuous variables. In other words, the variance between nearest neighbors is not greater than within-subject variance.

Figure 3C:
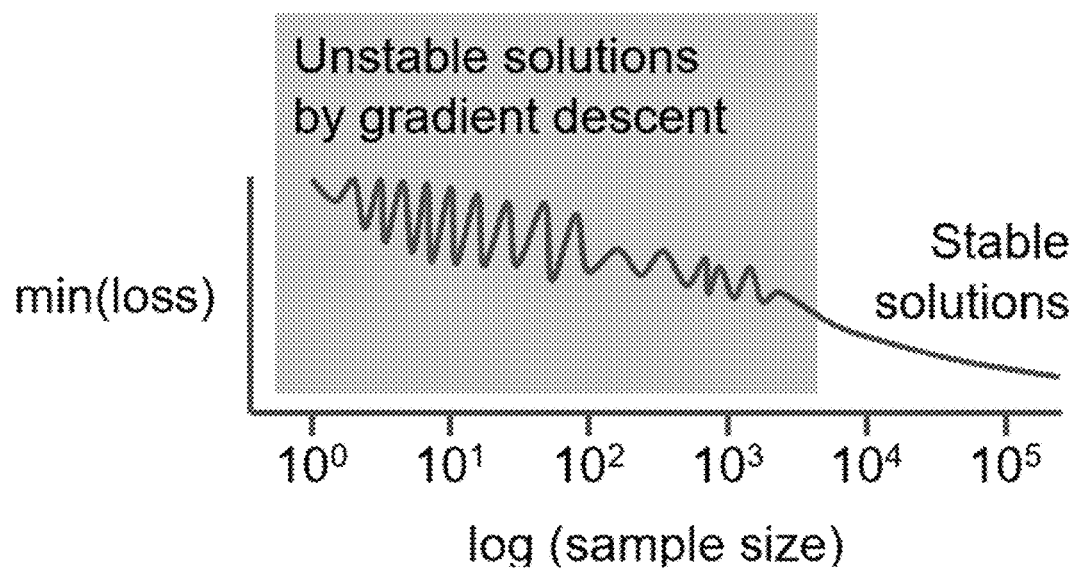

The method also works better on small datasets than gradient descent-type learning methods, which tend to yield noisy, unstable solutions that often poorly fit the observed distribution. FIG. 3C shows an example of the instability of a gradient descent-type learning method for small sample sizes (e.g., 100 to 1000 records per sample).

Figure 3D:
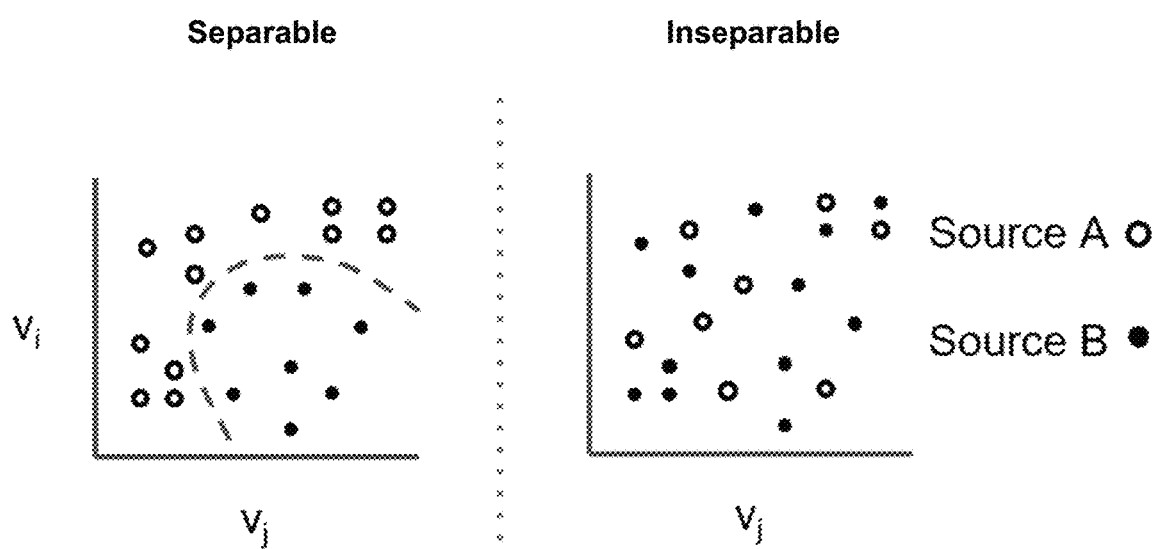

The method also works with datasets that require high source privacy (i.e., datasets that are difficult to determine who contributed which data). The number of data sources for clinical trial data is small (i.e., relatively easy to guess), so the data should not be separable in ways that allow someone to determine who the data contributor is. FIG. 3D shows separable and inseparable distributions of data contributed by sources A and B. Data are curated in the inventive method to confound separation attacks.

Once synthetic record $r^{s'}$ is generated, it is stored in operation 135 as part of synthetic dataset R'. Then the method selects a new seed record in operation 140 and returns to operation 125 to generate another synthetic record using features from the k nearest neighbors of this new seed record. This loop is performed a total of N times, and each synthetic record is concatenated with the previous synthetic records to form synthetic dataset R' 195 having N records.

Besides the operations shown in FIG. 1C, other operations or series of operations are contemplated to generate a synthetic dataset from an original dataset of records. Moreover, the actual order of the operations in the flowchart in FIG. 1C is not intended to be limiting, and the operations may be performed in any practical order.

The method and system compare favorably to the prior art machine learning methods used to anonymize electronic health records and other data, while still being accurate and having fidelity to the original dataset. The method and system work better with respect to both subject-level privacy and source-, contributor-, or sponsor-level privacy.

The inventors evaluated the performance of the techniques of the present invention on a proprietary dataset consisting of three clinical trials for clinically homogeneous study cohorts in highly refractory Multiple Myeloma. To evaluate the performance on a wider variety of settings, the techniques were also tested on four public datasets from the University of California Irvine (UCI) machine learning repository: the UCI heart disease, UCI heart failure, UCI breast cancer, and UCI lung cancer datasets.

Performance or Fidelity Assessments

The inventors used the Synthetic Data Gym (SDGym) to benchmark the techniques against other state-of-the-art synthesizers. The SDGym benchmark (Synthetic Data Vault Project (N. Patki, R. Wedge, K. Veeramachaneni, "The Synthetic Data Vault" (2018), https://sdv.dev/SDV/index-.html)) is a library that offers a collection of both real and simulated datasets along with a set of classical and novel synthetic data generators to use as comparative baselines. The benchmark uses the "likelihood fitness" metric and the "machine learning efficacy" metric. The "likelihood fitness" metric is used on the synthetic data generated from simulated datasets. The "machine learning efficacy" metric is used on the synthetic data generated from real datasets. Because the simulated data come from a known distribution, the likelihood fitness test checks whether features in the synthetic dataset follow the same joint distribution as those in the original dataset. To test the machine learning efficacy on the synthetic data generated from real data, the SDGym benchmark uses the synthetic data to train a model to predict one feature given the others to see whether the model can achieve a similar performance on the original test data. Classifiers are evaluated via accuracy and F1 scores, and regressions are evaluated via R-squared. Details underlying the SDGym benchmark are found at https://github.com/sdv-dev/SDGym.

To evaluate the fidelity of the synthesized dataset, cross-validation tests were performed on both the synthesized and source dataset to examine how well the source's underlying properties are preserved. The Fisher Exact and the Kolmogorov-Smirnov (K-S) tests are used on both binary and non-binary features; the mean values of numeric features are also compared to examine univariate fidelity. For multivariate inspections, pairwise feature correlations in the synthetic data are examined and compared with those in the original data. Additionally, unsupervised methods like a bag-of-words (BoW) representation are used to compare the synthetic dataset to the original dataset. To measure the separability of the synthetic dataset from the original, a silhouette coefficient and a random forest classifier are used. A silhouette coefficient is a multivariate, unsupervised metric that compares one cluster against another and quantifies the overlap of the real and synthetic datasets. A random forest classifier, which is supervised, predicts the outcome of a subject at the end of the trial period. Area under the curve (AUC) is used to measure the accuracy of the random forest classifier.

Privacy Assessment

The ability of the invention's methodology to preserve privacy at both the subject/individual level and the source level is also evaluated. For subject-level privacy, the methodology's robustness to membership disclosure risks and attribute disclosure risks is examined in addition to examining whether the invention memorizes records from source-level data and produces them in the synthesized data.

As background, membership disclosure risk is defined as determining whether the "real" (i.e., training) dataset contains a subject of interest. See Z. Zhang, C. Yan, D. Mesa, J. Sun, and B. Malin, "Ensuring electronic medical record simulation through better training, modeling, and evaluation," JAMIA 27(1): 99-108 (2020). In clinical trial datasets, all subjects within a study have a certain condition that is common among all trial participants. If a "data attacker" can determine the membership of a subject of interest in the dataset, the attacker may ascertain that the subject has a specific condition specific to the trial. If the attacker is able to prove that even a single subject is in a study, the attacker can discredit the institution and show violation of patient privacy laws or regulations. To evaluate this risk, a test set resembling the records of interest to the attacker are generated by randomly sampling a fraction of the records from the original dataset. K-Fold cross-validation was used with K=10. For each record, its Hamming distance to the records in the synthetic dataset is determined, and if the distance is smaller than a threshold value, the record is flagged as matching a record from the original dataset. If the record is in fact in the original dataset, the detection is labeled as a true positive, otherwise it is labeled as a false positive. For numerical values, the modified Hamming distance regards two attribute values as equivalent if they are within 2.5% of one another.

Attribute disclosure risks arise when a subject's sensitive features can be imputed from a known set of the subject's more general attributes. To evaluate this risk, a scenario is considered in which an attacker has partial knowledge of the original data, for example, a subset of records and/or attributes. For instance, suppose that along with the synthetic dataset, the attacker has access to some demographic information of some subjects in the original data. If r denotes the fraction of the original records known to the attacker and p denotes the fraction of attributes/features known to the attacker, the parameters r and p can be varied to examine how well the methodology performs in protecting/leaking records from the source. This is done by first generating a set of records resembling the compromised dataset by randomly sampling a fraction of the records and features from the original dataset. Then the closest record (i.e., the one-nearest neighbor) is determined from the synthetic dataset to each compromised record and the missing value is imputed to see how the method's synthetic data fare in preserving the privacy of the underlying source data.

Source-level privacy typically includes that the data must not reveal their ownership properties (e.g., identity of ownership, number of sources, etc.). In one embodiment of the inventive methodology, the generation step includes subjects from multiple sources so as to reduce source identifiability.

RESULTS

Fidelity and Accuracy

Figure 4:
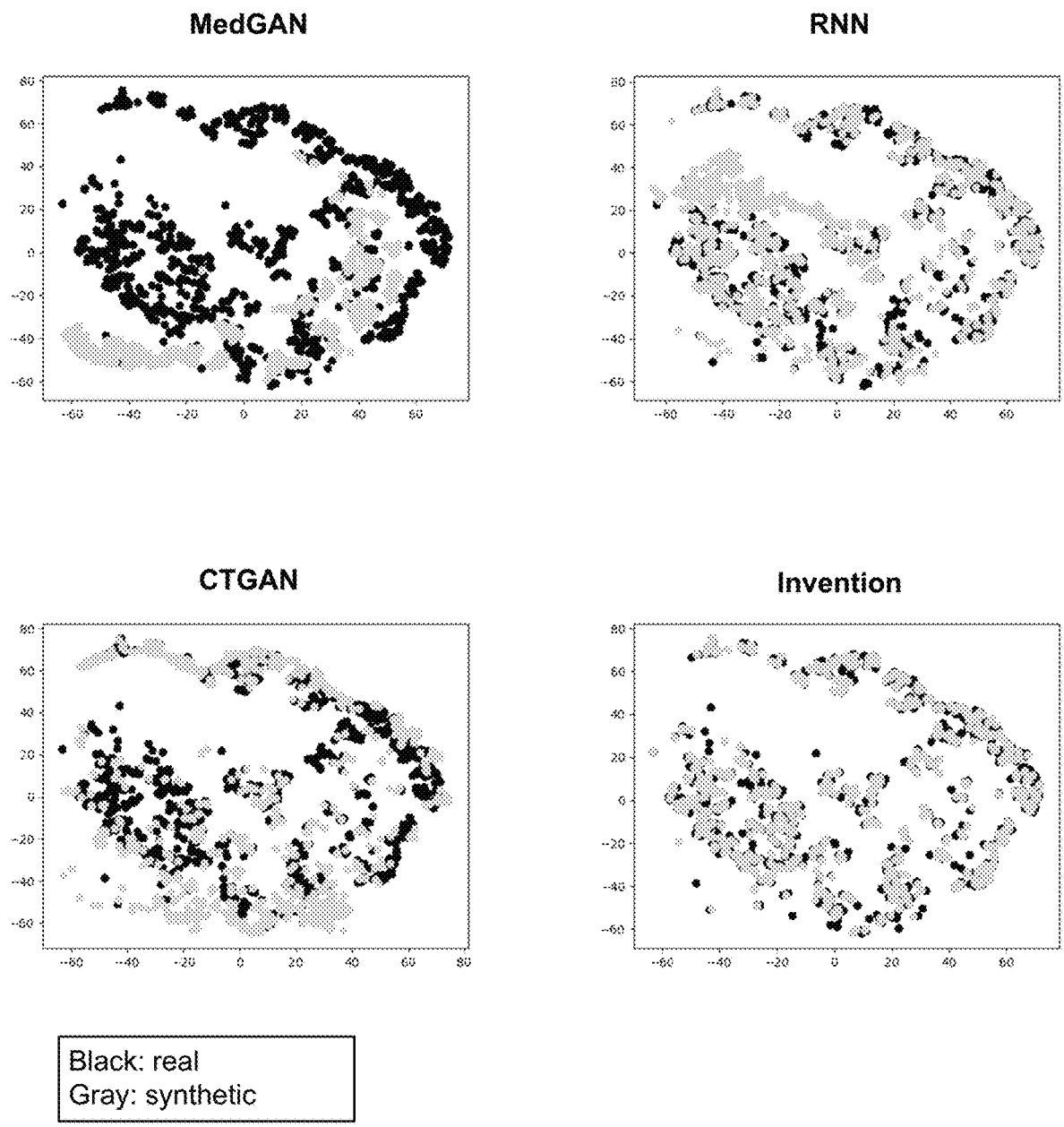
FIG. 4 shows scatter plots comparing original versus synthetic data using four different synthesizer methods, including one for an embodiment of the present invention.

FIG. 4 compares scatter plots of the original source Multiple Myeloma dataset (in blue) and its synthetic data (in orange) from 946 subjects with 40 features for MedGAN (medical generative adversarial network), RNN (recurrent neural network), CTGAN (conditional generative adversarial network), and the invention. (The scatter plots are visualized using t-SNE for dimension reduction.) From visual inspection, the inventive method creates a synthetic dataset that overlaps the real dataset very well, even for small cluster sizes.

Table 1 shows quantitative results of the performance of the inventive method (with k=5) and the neural network methods of FIG. 4 using several different univariate, bivariate, multivariate, and supervised and unsupervised metrics. As mentioned above, a silhouette coefficient is a multivariate, unsupervised metric that compares one cluster against another and quantifies the overlap of the real and synthetic datasets. The closer the coefficient is to zero the better. The silhouette coefficient for the inventive method is -0.001, which is much better than that of the other three methods.

TABLE 1

Results of Synthesizers on Multiple Myeloma Dataset (40 features)

| Method | Silhouette Coefficient | AUC on Real Data | AUC on Synthesized Data | Distance Between BoW Representations | Fisher Exact and K-S Test p-value = 0.05 | Accuracy of classifying real from synthesized |
|---|---|---|---|---|---|---|
| MedGAN | 0.093 | 0.595 | 0.931 | 0.268 | 16/40 | 0.99 |
| RNN | 0.078 | 0.593 | 0.688 | 0.136 | 12/40 | 0.77 |
| CTGAN | 0.014 | 0.591 | 0.464 | 0.017 | 15/40 | 0.94 |
| Invention | −0.001 | 0.583 | 0.578 | 0.009 | 0/40 | 0.61 |

Table 1 also shows the AUC (area under the curve) for the real data and the synthesized data, which are multivariate, supervised metrics. These metrics provide prediction accuracy—if one knows 39 out of the 40 features, how well can the 40th feature be predicted? The closer the two AUCs are to each other, the better. In this case, the AUCs for the inventive method are only 0.005 apart, which is much better than the other three methods.

The next metric, Distance Between BoW (bag of words) Representations, is a multivariate, unsupervised metric. In this case, "bag of words" corresponds to "bag of features" and indicates the frequencies of all the binned features in the data using a histogram. As with silhouette coefficient, the closer the distance between BoW representations is to zero the better. In this case, the distance between BoW representations for the inventive method is 0.009, which is much better than the other three methods.

The next metrics are the Fisher Exact test and the KS (Kolmogorov-Smirnov) test. These tests are univariate metrics that compare the statistical distributions of each feature in the real and synthetic datasets. Fisher Exact is used for categorical features, and KS is used for numerical features. The p-value threshold for these tests is set at 5% (or 0.05). Table 1 shows the number of features that have different statistical distributions in the real and synthetic datasets—the fewer the better. In this case, none of the 40 features using the inventive test had different statistical distributions in the real and synthetic datasets, which is much better than any of the other three methods, in which at least 12 features had different statistical distributions.

The last metric in Table 1 shows the accuracy of classifying the real dataset from the synthesized dataset. This metric measures whether the classifier is confused, where total confusion means that classification is only 50% or 0.5. The metric goes from 0.5 to 1.0, and the closer to 0.5 the better. In this case, the accuracy for the inventive method is just 0.61 (or 61%), which is much better than any of the other three methods, two of which (medGAN and CTGAN) were close to 100%.

Table 2 shows the means of various numeric features from the Multiple Myeloma dataset comparing the original (e.g., real) data with the synthetic data generated using the med-GAN, RNN, and the inventive methods. Subject's Baseline Functioning Level is the ECOG (Eastern Cooperative Oncology Group) performance status of the subject, which is an integer ranging from 0 (fully active) to 5 (deceased), with gradations of restrictions in between. For most of the features, the inventive method produced the best results.

TABLE 2

Comparisons of Means of Real vs. Synthetic Numerical Features

| Feature | Real Data | MedGAN | RNN | Inventive Method |
|---|---|---|---|---|
| Age | 64 | 43.24 | 63.1 | 64.51 |
| Weight (kg) | 73.14 | 41.75 | 73.89 | 73.21 |
| No. Yrs. Since Diagnosis | 6.51 | 1.48 | 7.4 | 6.57 |
| Time from last Progressive Disease | 80.95 | 64.95 | 80.8 | 77.63 |
| No. Prior Lines of Therapy | 5.13 | 4.95 | 5.16 | 5.24 |
| Subject's Baseline Functioning Level (ECOG Level) | 0.86 | 0 | 0.87 | 0.85 |
| No. Drug Classes with Refractory Response | 3.47 | 5.28 | 3.49 | 3.49 |
| Overall Survival (days) | 443.99 | 275.35 | 260.82 | 443.39 |

Table 3 shows cross-validation results of the metrics from Table 1 showing how the inventive method performed on public and private datasets having differing sizes (no. of records x no. of features). The multiple myeloma dataset is the same one appearing in Tables 1 and 2 (but the AUC and BoW values may change every time a new synthetic set is generated). The breast cancer dataset is a proprietary one having the most records of all the datasets. The other four datasets are publicly available from the UCI machine learning repository. The inventive method performed the worst on the UCI lung cancer dataset because it is very small (i.e., <100 records) and the number of features is larger than the number of records, so t-SNE and PCA do not perform well.

TABLE 3

Results of Inventive Method Synthesis on Various Datasets

| Dataset | Shape | AUC on Real Data | AUC on Synthesized Data | Distance Between BoW Representations | Fisher Exact and K-S Test p-value = 0.05 |
|---|---|---|---|---|---|
| Multiple Myeloma | 946 × 40 | 0.674 | 0.691 | 0.007 | 0/40 |
| Breast Cancer | 1528 × 33 | 0.646 | 0.614 | 0.005 | 0/33 |
| UCI Heart Disease | 267 × 14 | 0.568 | 0.498 | 0.032 | 0/14 |
| UCI Heart Failure | 299 × 13 | 0.910 | 0.961 | 0.075 | 0/13 |
| UCI Breast Cancer | 569 × 32 | 0.991 | 0.980 | 0.011 | 0/32 |
| UCI Lung Cancer | 35 × 56 | 0.606 | 0.406 | 0.282 | 0/56 |

Tables 4A and 4B use the SDGym benchmark to compare the performance of the inventive method with that of 14 other methods on non-clinical, simulated and real datasets. Table 4A includes seven simulated datasets each having 10,000 records and from two to 37 features. Table 4B includes eight real datasets having from 22,500 to 481,000 records and from 15 to 785 features. The inventive method used a cluster size of k=5, and PCA was used to synthesize datasets due to their large sizes.

The items in green show the best performing synthesizer on each dataset while the red items show the worst; for the green (red)-colored items, the darker the shade, the better (worse) the performance. The inventive method consistently outperformed other methods on most datasets: note that the results for the inventive method are almost identical to the Identity synthesizer. Despite the high fidelity of the data synthesized according to the inventive method, a high degree of privacy is still preserved as discussed in the following sections.

TABLE 4A

Performance of the Inventive and Fourteen Other Methods on Simulated Datasets

| Group | Synthesizer | Description | Name |  |  |  |  |  |  |
|---|---|---|---|---|---|---|---|---|---|
|  |  |  | insurance | grid | asia | child Shape | alarm | ring | gridr |
|  |  |  | 10000x27 | 10000x2 | 10000x8 | 10000x20 | 10000x37 | 10000x2 | 10000x2 |
| Embedding | Inventive Method | Uses high-dimensional embeddings. | −12.9 | −3.5 | −2.2 | −12 | −10.3 | −1.7 | −3.6 |
| Trivial | Identity | The synthetic data are the same as the training data. | −13 | −3.5 | −2.2 | −12 | −10.3 | −1.7 | −3.6 |
|  | Uniform | Each column in the synthetic data is sampled independently and uniformly. | −18.4 | −4.5 | −5.5 | −19.3 | −18.4 | −2.5 | −4.6 |
|  | Independent | Each column in the synthetic data is sampled independently. Continuous columns use the Gaussian Mixture Model and discrete columns use the PMF of training data. | −17.6 | −3.5 | −3 | −16 | −15.8 | −2 | −4 |
| GANs | MedGAN | Minibatch averaging to efficiently avoid mode collapse. | −15.1 | −90 | −6 | −13 | −13.3 | −150 | −141 |
|  | VEEGAN | The method features a reconstructor network, reversing the action of the generator by mapping from | −18.1 | −424 | −6 | −17.7 | −18.2 | −6.4 | −8.9 |

TABLE 4A-continued

Performance of the Inventive and Fourteen Other Methods on Simulated Datasets

| | | | Name | | | | | | |
|---|---|---|---|---|---|---|---|---|---|
| | | | insurance | grid | asia | child | alarm | ring | gridr |
| | | | | | | Shape | | | |
| Group | Synthesizer | Description | 10000x27 | 10000x2 | 10000x8 | 10000x20 | 10000x37 | 10000x2 | 10000x2 |
| | | data to noise. | | | | | | | |
| | CTGAN | Models discrete and continuous columns. | −15 | −5.1 | −2.5 | −12.8 | −13.1 | −2.7 | −5 |
| | CopulaGAN | Uses GaussianCopulas to make the underlying CTGAN model task of learning the data. | −15 | −5.1 | −2.4 | −12.9 | −13.1 | −2.8 | −5 |
| | TableGAN | Generates synthetic data using a convolutional neural network which optimizes the label column's quality. | −14.3 | −5.3 | −2.7 | −13.4 | −11.5 | −2.5 | −4.6 |
| VAEs | TVAE | Based on the VAE-based Deep Learning data synthesizer. | −14.2 | −5.7 | −2.3 | −12.3 | −10.8 | −1.9 | −3.7 |
| Others | CLBN | Uses Bayesian networks. | −13.9 | −9.2 | −2.3 | −12.3 | −11.2 | −47.2 | −7.4 |
| | PrivBN | A differential privacy method that uses a Bayesian network to model the correlation among the attributes. | −13.6 | −8.3 | −2.2 | −12.2 | −11.1 | N/A | −7.1 |
| | Gaussian Copula Categorical | Based on copula functions and uses a Categorical Transformer. | −16.6 | −4.5 | −3.6 | −15.5 | −15.6 | −2.2 | −4.5 |
| | Gaussian Copula Categorical Fuzzy | Based on copula functions and uses a Categorical Transformer with fuzzy = True. | −16.5 | −4.6 | −3.1 | −15.4 | −14.6 | −2.2 | −4.6 |
| | Gaussian Copula One-Hot | Based on copula functions and uses a One-Hot Encoding Transformer. | 17.9 | −4.5 | −3.2 | −15.3 | −15.7 | −2.2 | −4.6 |

TABLE 4A

Performance of the Inventive and Fourteen Other Methods on Real Datasets

| | | | Name | | | | | | | |
|---|---|---|---|---|---|---|---|---|---|---|
| | | | mnist-12 | mnist-28 | news | adult | covtype | credit | intrusion | census |
| | | | | | | Shape | | | | |
| Group | Synthesizer | Description | 60000x145 | 60000x785 | 31644x59 | 22561x15 | 481012x55 | 264807x30 | 394021x41 | 199523x41 |
| Embedding | Inventive Method | Uses high-dimensional embeddings. | 0.9 | 0.9 | 0.1 | 0.8 | 0.8 | 1.0 | 1.0 | 0.9 |
| Trivial | Identity | The synthetic data are the same as the training data. | 0.9 | 0.9 | 0.1 | 0.8 | 0.8 | 1.0 | 1.0 | 0.9 |
| | Uniform | Each column in the synthetic data is sampled independently and uniformly. | 0.1 | 0.1 | −4.0 | 0.5 | 0.1 | 0.6 | 0.1 | 0.5 |
| | Independent | Each column in the synthetic data is sampled independently. Continuous columns use the Gaussian Mixture Model and discrete columns use the PMF of training data. | 0.1 | 0.2 | −0.06 | 0.6 | 0.4 | 0.9 | 0.7 | 0.7 |
| GANs | MedGAN | Minibatch averaging to efficiently avoid mode collapse. | 0.4 | 0.1 | −6.0 | 0.6 | 0.4 | 0.9 | 0.9 | 0.6 |
| | VEEGAN | The method features a | 0.4 | 0.2 | $-3 \times 10^8$ | 0.7 | 0.2 | 0.9 | 0.5 | 0.8 |

TABLE 4A-continued

Performance of the Inventive and Fourteen Other Methods on Real Datasets

| | | | Name | | | | | | | |
|---|---|---|---|---|---|---|---|---|---|---|
| | | | mnist-12 | mnist-28 | news | adult | covtype | credit | intrusion | census |
| | | | | | | Shape | | | | |
| Group | Synthesizer | Description | 60000x145 | 60000x785 | 31644x59 | 22561x15 | 481012x55 | 264807x30 | 394021x41 | 199523x41 |
| | | reconstructor network, reversing the action of the generator by mapping from data to noise. | | | | | | | | |
| | CTGAN | Models discrete and continuous columns. | 0.1 | 0.1 | −0.07 | 0.8 | 0.6 | 1.0 | 1.0 | 0.9 |
| | CopulaGAN | Uses GaussianCopulas to make the underlying CTGAN model task of learning the data. | 0.2 | 0.2 | −0.06 | 0.8 | 0.6 | 1.0 | 1.0 | 0.9 |
| | TableGAN | Generates synthetic data using a convolutional neural network which optimizes the label column's quality. | 0.1 | 0.1 | −6.0 | 0.8 | 0 | 1.0 | N/A | 0.9 |
| VAEs | TVAE | Based on the VAE-based Deep Learning data synthesizer. | 0.8 | 0.8 | −0.02 | 0.8 | 0.7 | 1.0 | 1 | 0.9 |
| Others | CLBN | Uses Bayesian networks. | 0.7 | 0.2 | −7.0 | 0.8 | 0.6 | 1.0 | 0.9 | 0.9 |
| | PrivBN | A differential privacy method that uses a Bayesian network to model the correlation among the attributes. | N/A | N/A | N/A | 0.8 | 0.5 | 1.0 | 0.9 | 0.9 |
| | Gaussian Copula Categorical | Based on copula functions and uses a Categorical Transformer. | 0.1 | N/A | −5.0 | | 0.4 | 1.0 | 1.0 | 0.9 |
| | Gaussian Copula Categorical Fuzzy | Based on copula functions and uses a Categorical Transformer with fuzzy = True. | 0.2 | 0.2 | −9.0 | 0.8 | 0.4 | 1.0 | 0.8 | 0.8 |
| | Gaussian Copula One-Hot | Based on copula functions and uses a One-Hot Encoding Transformer. | 0.5 | 0.5 | −4.0 | 0.8 | 0.5 | 1.0 | 0.9 | 0.9 |

Subject-level privacy

Throughout the inventors' experiments, the number of subjects from the original dataset that also appear in the synthetic dataset has consistently been zero; in generating synthetic data, the inventive methodology does not replicate or memorize records from the underlying source data.

Figure 5:
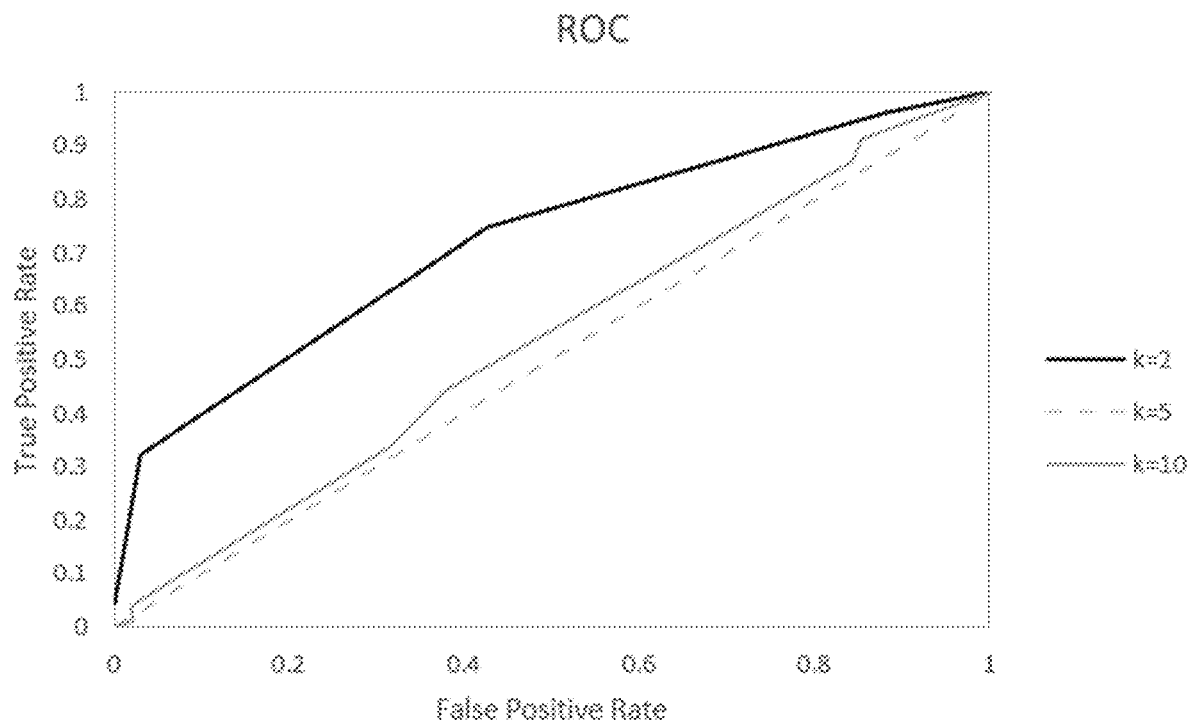
FIG. 5 shows receiver operating characteristic curves for several cluster sizes, according to embodiments of the present invention.

FIG. 5 shows the ROC (receiver operating characteristic) curves for cluster sizes 2, 5, and 10. For cluster size 2, the AUC is 0.7, and for cluster sizes 5 and 10, the AUC is close to 0.5. The higher the AUC, the better the prediction accuracy. But, as mentioned earlier, as cluster size decreases, so does privacy. For cluster sizes 5 and 10, a data attacker is unable to distinguish members from non-members (i.e., whether a piece of data was part of the original dataset), minimizing the likelihood of disclosure risk, so those are better values to use if privacy is important.

Figure 6:
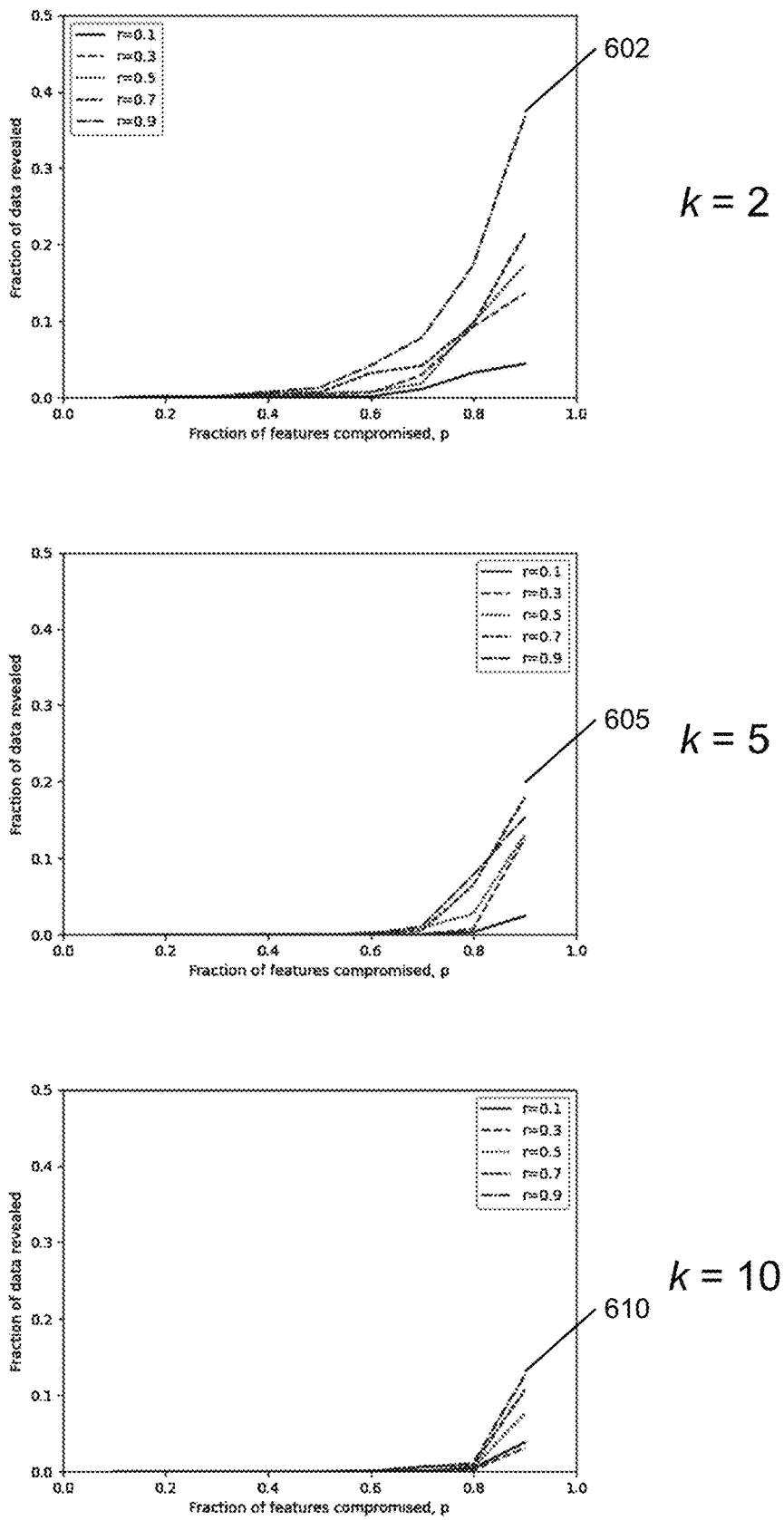
FIG. 6 shows fractions of data revealed to a data attacker as a function of compromised records and compromised features for several cluster sizes, according to embodiments of the present invention.

FIG. 6 shows the fractions of data revealed to a data attacker as a function of r (fraction of the compromised records) and p (fraction of the features known to the attacker for the compromised records) for cluster sizes of 2, 5, and 10. The worst-case scenario is shown in the top graph with cluster size k=2: even when 90% of the records are compromised (r=0.9) with 90% of their features compromised (p=0.9), the attacker can uniquely recover at most 40% of the records, as indicated by reference 602. The middle graph of FIG. 6, where k=5, shows that when 70% of the subjects are compromised (r=0.7) with 90% of their features compromised (p=0.9), the attacker can uniquely recover at most 18% of the records, as indicated by reference 605. The bottom graph of FIG. 6, where k=10, shows that when 90% of the subjects are compromised (r=0.7) with 90% of their features compromised (p=0.9), the attacker can uniquely recover at most 13% of the records, as indicated by reference 610. Thus, the privacy level of the synthetic data can be increased by increasing the cluster size. Since increasing cluster size tends to lower the quality (fidelity) of the generated synthetic data, we need to choose the value of k that is best suited for both fidelity and privacy, depending on the type of data and the application. The data used in the experiments to generate the curves in FIG. 6 (the Multiple Myeloma trial data discussed above) contain 946 subjects with 40 features. In practice, data attackers tend to know an average of 4-7 features about a subject, which for this dataset is roughly 10%-18% of total feature size (or p between 0.10 and 0.18). So, for these values of p, FIG. 6 shows that a very small amount of data could be revealed if k=2, but if k=5 or 10, that amount is reduced to near zero.

Sponsor-level privacy

Figure 7A:
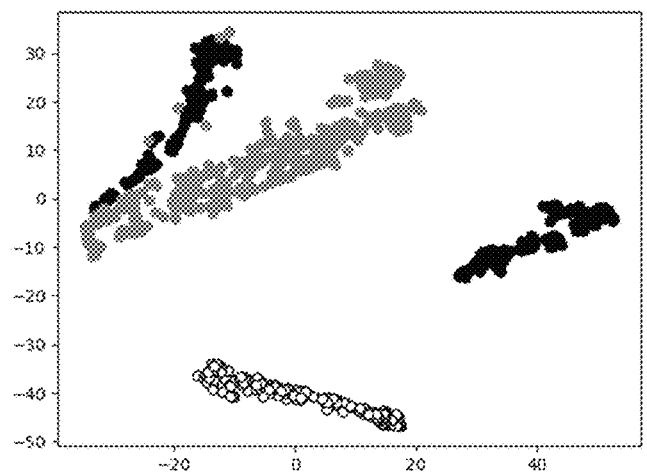
FIGS. 7A-7C are visualizations of clinical trial data with varying level of features removed, according to embodiments of the present invention.
Figure 7B:
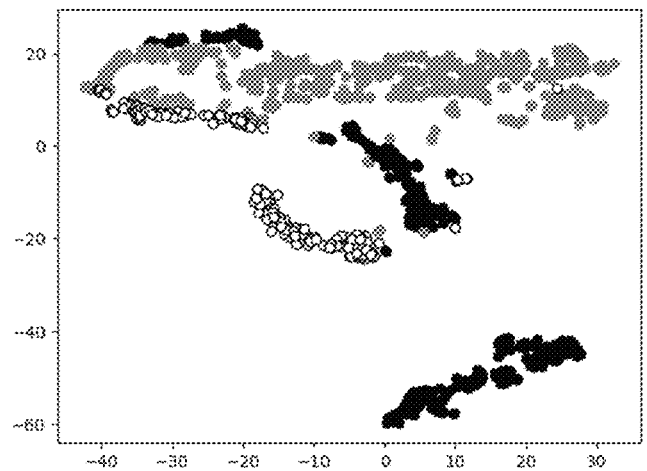
Figure 7C:
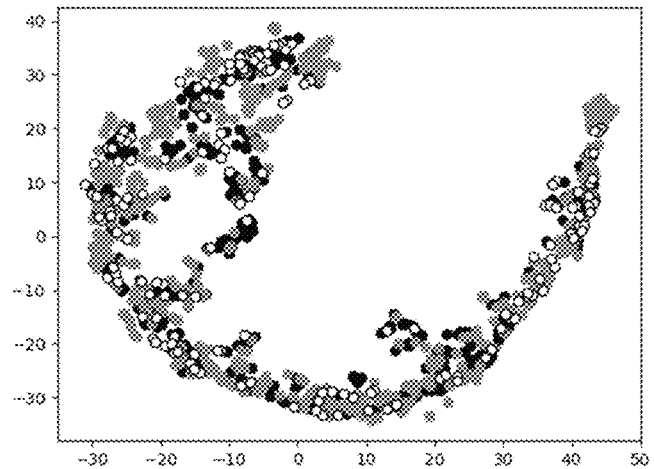

FIGS. 7A-7C are t-SNE visualizations of clinical trial data from 946 Multiple Myeloma subjects. FIG. 7A, including all 40 features from those subjects, reveals that the Multiple Myeloma data are built from three sources (i.e., three clinical trials). The visual separability of the data sources arises due to missing features in some datasets along with differences in units or modes of lab measurements. To obfuscate the separability in the data, the inventors trained a random forest classifier to learn which source each record belongs to. Distinctive features were then removed one by one until the data were no longer separable. FIG. 7B shows records with the 8 most distinctive features removed, but there is still some ability to segregate the data sources. FIG. 7C shows records with the 23 most distinctive features removed, at which point the data sources are not separately identifiable. Thus, the invention offers a degree of protection at the source level, but involves a trade-off between decreasing source identifiability and excluding features from the data.

In sum, the invention generates synthetic electronic health data from valuable clinical trial data that, until now, were not able to be used. Clinical trial data are generally found in smaller datasets that have legal and regulatory protections and are subject to privacy issues. Because the datasets are small, neural network algorithms have not been able to resolve all of these challenges. The invention thus enables research and innovation based on these data by people who could not otherwise directly access the data due to these challenges.

The invention can effectively generate high-fidelity, synthetic, subject-level EDC data from all tabular data sizes and is particularly well-suited for smaller datasets (i.e., on the order of hundreds of records). The method is efficient, controllable, and traceable—capable of synthesizing any high-dimensional multivariate tabular data while preserving subject and sponsor/contributor/source privacy to a high degree. The invention does not learn a high-dimensional conditional representation such as with GANs or VAEs, but rather combines a low-dimensional embedding of the source data to identify a subject's nearest neighbors in compressed feature space, with feature permutation and recombining between similar subjects. The synthetically generated data are statistically similar to the source data and capture the source's underlying dependencies. The method does not memorize or retain records from the original data and does not reveal any specific features from the original data, thus preserving subject privacy.

In addition, the generated data can be up-sampled or down-sampled from the original source data or can be the exact size. Each generated record representing a subject can be mapped to a small cluster of the subjects that were used to produce it. This allows for flexibility and generating data focused on the specific needs of a data user such as a researcher. This also allows for flexibility in choosing the characteristics of the subjects for which the synthetic copies are made. A synthetic subject can be made to inherit features from subjects coming from multiple contributors, thus preserving the privacy of the contributors.

Another advantage is the inventive method makes no a priori assumptions about input data types (e.g., it can handle both categorical and numeric features). The algorithm also makes no assumptions regarding the underlying distribution of the features. Moreover, compared to other approaches that require extensive fine-tuning, hyper-parameter optimization, fitting, and/or setup, the inventive method is lightweight, agile, and easy to implement and to deploy. It can effectively handle features of mixed datatypes automatically without any additional encoding and architectural change, as some of the GANs require. It also runs in a fraction of time compared to training a neural network.

The invention preserves the underlying privacy of the real data as evaluated by the heuristic tests described above, while allowing for flexibility in data generation. For instance, to customize or emphasize certain dependencies between specific features in subjects that may be particularly reflective of subjects with a rare disease where a data user (e.g., a researcher) may desire synthetically generated subjects, one can design a custom permutation function after the embedding process to generate new subjects with the desired properties.

Aspects of the present invention may be embodied in the form of a system, a computer program product, or a method. Similarly, aspects of the present invention may be embodied as hardware, software, or a combination of both. Aspects of the present invention may be embodied as a computer program product saved on one or more computer-readable media in the form of computer-readable program code embodied thereon.

The computer-readable medium may be a computer-readable storage medium. A computer-readable storage medium may be, for example, an electronic, optical, magnetic, electromagnetic, infrared, or semiconductor system, apparatus, or device, or any combination thereof.

Computer program code in embodiments of the present invention may be written in any suitable programming language. The program code may execute on a single computer, or on a plurality of computers. The computer may include a processing unit in communication with a computer-usable medium, where the computer-usable medium contains a set of instructions, and where the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A method for generating a synthetic dataset comprising N records from an original dataset, wherein each record comprises categorical features, the method comprising:
   encoding the categorical features of the records from the original dataset;
   embedding the encoded records in a low-dimensional space;
   selecting a seed record from the encoded and embedded records;
   identifying a plurality of nearest neighbor records to the selected seed record;
   generating a new record by randomly selecting features from the plurality of nearest neighbor records;
   concatenating the generated new record into the synthetic dataset;
   selecting a new seed record; and
   repeating the identifying, generating, concatenating, and selecting operations N-1 times for each newly selected seed record in the encoded and embedded records.

2. The method of claim 1, wherein encoding categorical features of the original dataset comprises converting categorical values to numeric values.

3. The method of claim 1, wherein the embedding comprises using t-stochastic neighbor embedding.

4. The method of claim 1, wherein the embedding comprises using uniform manifold approximation and projection.

5. The method of claim 1, wherein the embedding comprises using principal component analysis.

6. The method of claim 1, wherein the original dataset comprises a mixture of categorical and numerical features.

7. The method of claim 1, further comprising adding noise to the numeric features to generate different feature values.

8. The method of claim 1, wherein the original dataset contains n records and N=n.

9. The method of claim 1, wherein the original dataset contains n records and N≠n.

10. The method of claim 1, wherein highly correlated features are co-segregated in the new record.

11. A system for generating a synthetic dataset comprising N records from an original dataset, wherein each record comprises categorical features, the system comprising:
    an encoder for encoding the categorical features of the records from the original dataset;
    an embedder for embedding the encoded records in a low-dimensional space;
    a clusterer for selecting a seed record from the encoded and embedded records and identifying a plurality of nearest neighbor records to the selected seed record; and
    a synthetic record generator that generates a new record by randomly selecting features from the plurality of nearest neighbor records and concatenates the generated new record into the synthetic dataset,
    wherein the selecting, identifying, generating, and concatenating operations are carried out N times for each newly selected seed record in the encoded and embedded records.

12. The system of claim 11, wherein encoding categorical features of the original dataset comprises converting categorical values to numeric values.

13. The system of claim 11, wherein the embedding comprises using t-stochastic neighbor embedding.

14. The system of claim 11, wherein the embedding comprises using uniform manifold approximation and projection.

15. The system of claim 11, wherein the embedding comprises using principal component analysis.

16. The system of claim 11, wherein the original dataset comprises a mixture of categorical and numerical features.

17. The system of claim 11, wherein noise is added to the numeric features to generate different feature values.

18. The system of claim 11, wherein the original dataset contains n records and N=n.

19. The system of claim 11, wherein the original dataset contains n records and N≠n.

20. The system of claim 11, further comprising a feature pairing detector for co-segregating highly correlated features in the new record.

* * * * *